(12) United States Patent
Li et al.

(10) Patent No.: US 10,899,654 B2
(45) Date of Patent: Jan. 26, 2021

(54) GLASS-BASED ARTICLES WITH IMPROVED STRESS PROFILES

(71) Applicant: CORNING INCORPORATED, Corning, NY (US)

(72) Inventors: Qiao Li, Horseheads, NY (US); Santona Pal, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/015,696

(22) Filed: Jun. 22, 2018

(65) Prior Publication Data
US 2019/0016627 A1   Jan. 17, 2019

Related U.S. Application Data

(60) Provisional application No. 62/531,964, filed on Jul. 13, 2017.

(51) Int. Cl.
| | | |
|---|---|---|
| *C03C 21/00* | (2006.01) | |
| *C03C 3/11* | (2006.01) | |
| *C03C 4/18* | (2006.01) | |

(52) U.S. Cl.
CPC .............. *C03C 3/11* (2013.01); *C03C 4/18* (2013.01); *C03C 21/002* (2013.01); *C03C 2204/00* (2013.01)

(58) Field of Classification Search
CPC .................................................. C03C 21/002
See application file for complete search history.

(56) References Cited

U.S. PATENT DOCUMENTS

| | | |
|---|---|---|
| 2,779,136 A | 1/1957 | Hood et al. |
| 3,533,888 A | 10/1970 | Eppler et al. |
| (Continued) | | |

FOREIGN PATENT DOCUMENTS

| | | | |
|---|---|---|---|
| WO | 2010005578 A1 | 1/2010 | |
| WO | 2013155281 A1 | 10/2013 | |
| (Continued) | | | |

OTHER PUBLICATIONS

International Search Report and Written Opinion PCT/US2018/040778 dated Nov. 27, 2018, 12 pgs.
(Continued)

*Primary Examiner* — Erin Snelting
(74) *Attorney, Agent, or Firm* — Jeffrey A. Schmidt

(57) ABSTRACT

Glass-based articles comprise: a glass-based substrate having opposing first and second surfaces defining a substrate thickness (t); a stress profile comprising: a compressive stress region extending from the first surface to a depth of compression (DOC), the DOC located at 0.04•t or deeper; and a central tension region. An alkali metal oxide is present in the central tension region. A first metal oxide whose metal has the same or smaller atomic radius as the metal of the alkali metal oxide, and a second metal oxide whose metal has a larger atomic radius than the metal of the alkali metal oxide are both present in independent concentrations that vary within at least a portion of the compressive stress region. The glass-based substrates are exposed to a multi-step ion exchange process including a first treatment of doping with ions smaller than the alkali metal oxide of the pre-fabricated glass-based substrate; and a second treatment of strengthening with larger ions to enable superior stress profile attributes. The first treatment may occur at temperatures within 300° C. of the strain point of the glass-based substrate.

23 Claims, 6 Drawing Sheets

(56) References Cited

U.S. PATENT DOCUMENTS

| | | | | |
|---|---|---|---|---|
| 4,671,814 A * | 6/1987 | Aratani | .................... | C03C 21/00 |
| | | | | 428/410 |
| 6,436,859 B1 * | 8/2002 | Muramoto | .............. | C03C 3/083 |
| | | | | 501/69 |
| 8,312,739 B2 * | 11/2012 | Lee | .......................... | C03C 3/093 |
| | | | | 65/30.13 |
| 8,561,429 B2 | 10/2013 | Allan et al. | | |
| 8,753,744 B2 | 6/2014 | Borrelli et al. | | |
| 8,854,623 B2 | 10/2014 | Fontaine et al. | | |
| 9,487,434 B2 | 11/2016 | Amin et al. | | |
| 2004/0163414 A1 * | 8/2004 | Eto | ....................... | G11B 5/8404 |
| | | | | 65/30.14 |
| 2010/0009154 A1 * | 1/2010 | Allan | ...................... | C03C 3/085 |
| | | | | 428/220 |
| 2012/0034435 A1 * | 2/2012 | Borrelli | ................... | C03C 17/30 |
| | | | | 428/210 |
| 2012/0052271 A1 * | 3/2012 | Gomez | ................... | C03C 3/091 |
| | | | | 428/213 |
| 2014/0066285 A1 * | 3/2014 | Beall | ........................ | C03B 20/00 |
| | | | | 501/32 |
| 2015/0064474 A1 * | 3/2015 | Dejneka | .................. | C03B 32/02 |
| | | | | 428/410 |
| 2015/0329413 A1 * | 11/2015 | Beall | ........................ | C03C 3/097 |
| | | | | 501/32 |
| 2015/0368153 A1 * | 12/2015 | Pesansky | .............. | C03C 21/002 |
| | | | | 428/220 |
| 2016/0194235 A1 * | 7/2016 | Hart | ........................ | C03B 32/02 |
| | | | | 428/410 |
| 2016/0280589 A1 * | 9/2016 | Beall | .................... | C03C 10/0009 |
| 2016/0329598 A1 * | 11/2016 | Schneider | ................. | C03C 3/12 |
| 2017/0174565 A1 * | 6/2017 | Kase | .................... | C09D 11/037 |

FOREIGN PATENT DOCUMENTS

| | | |
|---|---|---|
| WO | 2016070048 A1 | 5/2016 |
| WO | 2018143991 A1 | 8/2018 |

OTHER PUBLICATIONS

Bartholomew and Garfinkel. "Chemical Strengthening of Glass," Glass: Science and Technology, vol. 5, 1980, 217-269.

Fine and Danielson, "Chemical strengthening by the ion exchange of lithium for sodium," Physics and Chemistry of Glasses, 1988, 29, 4, 134-140.

"Mauro et al; ""Accelerating the Design of Functional Glasses Through Modeling""; Chem. Mater. 2016, 28, 4267-4277".

Taiwanese Patent Application No. 107124043; English Translation of the Notice of Allowance and Search Report dated Mar. 16, 2020; Taiwan Patent Office; 3 pgs.

* cited by examiner

GLASS-BASED ARTICLES WITH IMPROVED STRESS PROFILES

CROSS-REFERENCE TO RELATED APPLICATIONS FIELD

This application claims the benefit of priority under 35 U.S.C. § 119 of U.S. Provisional Application Ser. No. 62/531,964 filed on Jul. 13, 2017, the content of which is relied upon and incorporated herein by reference in its entirety.

FIELD

Embodiments of the disclosure generally relate to glass-based articles that have improved stress profiles with high depth of compression and methods for manufacturing the same.

BACKGROUND

Glass-based articles are used in many various industries including consumer electronics, transportation, architecture, defense, medical, and packaging. For consumer electronics, glass-based articles are used in electronic devices as cover plates or windows for portable or mobile electronic communication and entertainment devices, such as mobile phones, smart phones, tablets, video players, information terminal (IT) devices, laptop computers, navigation systems and the like. In architecture, glass-based articles are included in windows, shower panels, and countertops; and in transportation, glass-based articles are present in automobiles, trains, aircraft, sea craft. Glass-based articles are suitable for any application that requires superior fracture resistance but thin and light-weight articles. For each industry, mechanical and/or chemical reliability of the glass-based articles is typically driven by functionality, performance, and cost. Improving the mechanical and/or chemical reliability of these articles is an ongoing goal.

Chemical treatment is a strengthening method to impart a desired/engineered/improved stress profile having one or more of the following parameters: compressive stress (CS), depth of compression (DOC), and central tension (CT). Many glass-based articles, including those with engineered stress profiles, have a compressive stress that is highest or at a peak at the glass surface and reduces from a peak value moving away from the surface, and there is zero stress at some interior location of the glass article before the stress in the glass article becomes tensile. Chemical strengthening by ion exchange (IOX) of alkali-containing glass is a proven methodology in this field.

One way to engineer stress profiles to achieve desired parameters is to design new glass compositions. For example, alkali-alumino silicates developed for use in the consumer electronics provide much larger CS and deeper DOC than conventional soda lime silicates. This strategy has been effective in premium markets. Overall, however, multiple fundamentally new glass compositions or platform development and manufacturing can be an expensive and complex proposition for glass manufacturing enterprises and their customers in many other market segments and applications.

There is an on-going need to provide glass-based articles having mechanical and/or chemical reliability for their industry. There is also an ongoing need to do so in cost-effective ways.

SUMMARY

Aspects of the disclosure pertain to glass-based articles and methods for their manufacture.

A first aspect is a glass-based article comprising: a glass-based substrate having opposing first and second surfaces defining a substrate thickness (t); a stress profile comprising a compressive stress region extending from the first surface to a depth of compression (DOC), wherein the DOC is located at 0.04•t or deeper; and a central tension region. An alkali metal oxide is present in at least the central tension region, wherein the alkali metal oxide is not lithium oxide. A first metal oxide whose metal has the same or smaller atomic radius as the alkali metal of the alkali metal oxide, wherein a concentration of the first metal oxide varies within at least a portion of the compressive stress region; and a second metal oxide whose metal has a larger atomic radius than the alkali metal of the alkali metal oxide, wherein a concentration of the second metal oxide varies within at least a portion of the compressive stress region.

A second aspect according to the first aspect, wherein the glass-based substrate comprises a soda-lime silicate glass, an alkali-alumino silicate glass, an alkali-containing borosilicate glass, an alkali-containing aluminoborosilicate glass, or an alkali-containing glass-ceramic.

A third aspect according to any of the preceding aspects, wherein the alkali metal oxide comprises sodium, the first metal oxide comprises lithium and the second metal oxide comprises potassium.

A fourth aspect according to any of the preceding aspects, wherein the stress profile further comprises a depth of layer (DOL) with respect to the second metal oxide being located at about 5 microns or deeper.

A fifth aspect according to the fourth aspect, wherein a ratio of the DOC to the DOL is greater than 1:1.

A sixth aspect according to any of the preceding aspects, wherein the stress profile comprises a compressive stress at the first and second surfaces of 1000 MPa or greater.

A seventh aspect according to any of the preceding aspects, wherein the t is in the range of 0.1 mm to 10 mm.

An eighth aspect according to any of the preceding aspects, wherein the DOC is deeper than a comparative DOC of the glass-based substrate with the absence of the first metal oxide.

A ninth aspect according to any of the preceding aspects having a normalized weight loss after 24 hours dwell time in a water bath at 130° C. that is less than a comparative substrate with the absence of the first metal oxide.

A tenth aspect, further comprising one or more additional metal oxide selected from the group consisting of: silver oxide, copper oxide, zinc oxide, titanium oxide, rubidium oxide, cesium oxide, calcium oxide, and magnesium oxide, wherein a concentration of the one or more additional metal oxide varies within at least a portion of the compressive stress region.

An eleventh aspect is a glass-based article comprising: a glass-based substrate comprising a soda-lime silicate glass, the glass-based substrate having opposing first and second surfaces defining a substrate thickness (t); and a stress profile comprising a compressive stress region extending from the first surface to a depth of compression (DOC), wherein the DOC is located at 0.04•t or deeper and a depth of layer (DOL) with respect to potassium oxide is located at about 5 microns or deeper; and a central tension region. Sodium oxide is present in at least the central tension region. Lithium oxide is present in at least a portion of the compressive stress region, wherein a concentration of the lithium oxide varies within the compressive stress region; and the potassium oxide is present in at least a portion of the compressive stress region, wherein a concentration of the potassium oxide varies within the compressive stress region. A ratio of the DOC to the DOL is greater than 1:1. There is no lithium oxide at 0.5*t.

A twelfth aspect is a product for automotive, architecture, defense, medical, packaging, and/or safety applications comprising any glass-based article of the disclosure.

A thirteenth aspect is a consumer electronic product comprising: a housing having a front surface, a back surface, and side surfaces; electrical components provided at least partially within the housing, the electrical components including at least a controller, a memory, and a display, the display being provided at or adjacent the front surface of the housing; and a cover substrate disposed over the display, wherein at least one of a portion of the housing or the cover substrate comprises any glass-based article of the disclosure.

A fourteenth aspect is a method of manufacturing a glass-based article, which comprises: exposing a glass-based substrate that contains an alkali metal oxide in a base composition, the glass-based substrate having opposing first and second surfaces defining a substrate thickness (t), to a first ion exchange treatment including a first bath comprising metal ions that are smaller than the alkali metal of the alkali metal oxide in the base composition to form a doped glass-based substrate; and thereafter exposing the doped glass-based substrate to a second ion exchange treatment including a second bath comprising metal ions that are larger than the alkali metal of the alkali metal oxide in the base composition to form the glass-based article.

A fifteenth aspect according to the fourteenth aspect, wherein both the first and second metal ions and are present as first and second metal oxides in first and second concentrations that independently vary within at least a portion of the t.

A sixteenth aspect according to the fourteenth or fifteenth aspect in the absence of heat treatment to the glass-based substrate.

A seventeenth aspect according to any one of the fourteenth through sixteenth aspects, wherein the glass-based article has a stress profile comprising: a depth of compression (DOC) being located at 0.04•t or deeper and a central tension region.

An eighteenth aspect according to any one of the fourteenth through seventeenth aspects, wherein the doped glass-based substrate comprises a compressive stress (CS) that is in the range of 0 to less than about 1000 MPa.

A nineteenth aspect according to any one of the fourteenth through eighteenth aspects, wherein the first bath comprises lithium ions.

A twentieth aspect according to the nineteenth aspect, wherein the first bath further comprises potassium ions.

A twenty-first aspect according to any one of the fourteenth through twentieth aspects, wherein the first ion exchange treatment includes a first ion exchange between lithium of the first bath and sodium of the base composition, or among lithium and potassium, both of the first bath, and sodium of the base composition.

A twenty-second aspect according to any one of the fourteenth through twenty-first aspects, wherein the first ion exchange treatment is conducted at a bath temperature that is less than or equal to a glass transition temperature (Tg) of the glass-based substrate.

A twenty-third aspect according to any one of the fourteenth through twenty-second aspects, wherein the first ion exchange treatment is conducted at a bath temperature that is greater than a bath temperature of the second ion exchange treatment.

A twenty-fourth aspect according to any one of the fourteenth through twenty-third aspects, wherein the first ion exchange treatment is conducted at a bath temperature that is ±300° C. of a strain point of the glass-based substrate.

A twenty-fifth aspect according to any one of the fourteenth through twenty-fourth aspects, wherein the first ion exchange treatment is conducted at a bath temperature in the range of from 380 to 525° C.

A twenty-sixth aspect according to any one of the fourteenth through twenty-fifth aspects, wherein during the first ion exchange treatment a size ratio of the ions that are smaller than the alkali metal of the alkali metal oxide in the base composition to the alkali metal of the alkali metal oxide in the base composition is at least 0.2:1.

A twenty-seventh aspect according to any one of the fourteenth through twenty-sixth aspects, wherein the second bath comprises potassium ions.

A twenty-eighth aspect according to the twenty-seventh aspect, wherein the second bath further comprises sodium ions.

A twenty-ninth aspect according to any one of the fourteenth through twenty-eighth aspects, wherein the second ion exchange treatment includes a second ion exchange among potassium of the second bath and ion-exchanged lithium of the first ion exchange treatment and sodium of the base composition.

A thirtieth aspect according to the twenty-ninth aspect, wherein the second ion exchange treatment includes a second ion exchange among sodium of the second bath and ion-exchanged lithium of the first ion exchange treatment.

A thirty-first aspect according to any one of the fourteenth through thirtieth aspects, wherein the second bath further comprises one or more ions of: sodium, silver, copper, zinc, titanium, rubidium, cesium, calcium, and magnesium.

A thirty-second aspect according to any one of the fourteenth through thirty-first aspects, wherein the second ion exchange treatment is conducted at a bath temperature in the range of 370 to 450° C.

A thirty-third aspect according to any one of the fourteenth through thirty-second aspects, wherein the first ion exchange treatment, the second ion exchange treatment, or both are independently a thermal-diffusion process or an electro-diffusion process.

A thirty-fourth aspect according to any one of the fourteenth through thirty-third aspects, wherein the first ion exchange treatment independently comprises molten salts, eutectics, or both of ions.

A thirty-fifth aspect according to any one of the fourteenth through thirty-fourth aspects, wherein the second ion exchange treatment comprises molten salts of the ions.

A thirty-sixth aspect according to any one of the fourteenth through thirty-fifth aspects, wherein the base composition does not contain lithium oxide.

BRIEF DESCRIPTION OF THE DRAWINGS

The accompanying figures, which are incorporated in and constitute a part of this specification, illustrate several embodiments described below.

DETAILED DESCRIPTION

Figure 1:
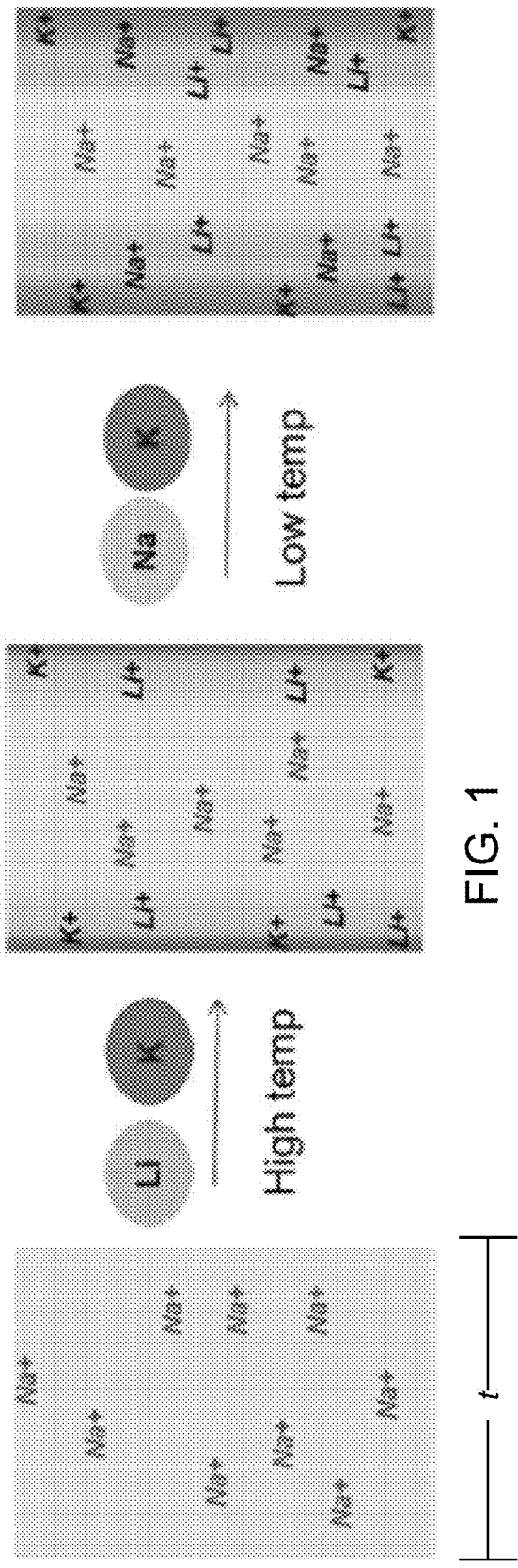
FIG. 1 illustrates a multi-step ion exchange (IOX) scheme.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

The terms "glass-based article" and "glass-based substrates" are used to include any object made wholly or partly of glass, including glass-ceramics (including an amorphous phase and a crystalline phase). Laminated glass-based articles include laminates of glass and non-glass materials, laminates of glass and crystalline materials. Glass-based substrates according to one or more embodiments can be selected from soda-lime silicate glass, alkali-alumino silicate glass, alkali-containing borosilicate glass, alkali-containing aluminoborosilicate glass, and alkali-containing glass-ceramics.

A "base composition" is a chemical make-up of a substrate prior to any ion exchange (IOX) treatment. That is, the base composition is undoped by any ions from IOX other in other words, the dopant ions are not present in the base composition of the glass-based substrate. In some embodiments, the base composition does not include lithium oxide ($Li_2O$).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant.

Unless otherwise specified, all compositions described herein are expressed in terms of mole percent (mol %) on an oxide basis.

A "stress profile" is stress with respect to position of a glass-based article. A compressive stress region extends from a first surface to a depth of compression (DOC) of the article, where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, compressive stress (CS) is expressed as a positive or absolute value—i.e., as recited herein, CS=|CS|. In addition, tensile stress is expressed herein as a negative (<0) stress. Central tension (CT) refers to tensile stress in a central region or a central tension region of the glass-based article. Maximum central tension (maximum CT or $CT_{max}$) occurs in the central tension region nominally at 0.5·t, where t is the article thickness, which allows for variation from exact center of the location of the maximum tensile stress.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge-Optical Emission Spectroscopy (GD-OES)). In some embodiments, the DOL is given as the depth of exchange of the slowest-diffusing or largest ion introduced by an ion exchange (IOX) process.

Unless otherwise specified, CT and CS are expressed herein in megaPascals (MPa), thickness is express in millimeters and DOC and DOL are expressed in microns (micrometers).

Compressive stress at the surface is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum CT value is measured using a scattered light polariscope (SCALP) technique known in the art.

DOC may be measured by FSM or SCALP depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth (or DOL) of potassium ions in such glass articles is measured by FSM.

Refracted near-field (RNF) method may also be used to measure attributes of the stress profile. When the RNF method is utilized, the maximum CT value provided by SCALP is utilized. In particular, the stress profile measured by the RNF method is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass-based article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Disclosed herein are glass-based articles having improved stress profiles with high depth of compression prepared by a universal strategy for strengthening alkali-containing glass or glass-ceramic substrates using multi-component, and multiple step ion-exchange. Methods herein use combinations of doping ions of small and large sizes in a specific doping and strengthening multi-step strategy of a given pre-fabricated glass to achieve enhancements in stress profiles not currently feasible for some glass-based substrates, for example, a generic soda-lime silicate glass, under a traditional one-step ion exchange, as shown in the Examples section below.

Rather than developing new glass-based compositions as a strategy for improving stress profile parameters, the present disclosure starts with a pre-fabricated glass-based substrate, which is modified in a multi-step ion exchange process including (a) a first treatment of doping with ions smaller than the alkali metals of the pre-fabricated glass-based substrate; and (b) a second treatment of strengthening with larger ions to enable superior stress profile attributes. The methods herein are advantageous for achieving generational improvements in mechanical and/or chemical reliability in market segments and applications that 1) are cost-sensitive, 2) have regulatory restrictions limiting compositional change, 3) are reluctant to change key functionalities of the preferred glass (for reasons of durability, formability, compatibility to downstream processes etc.).

With respect to the first treatment, a doping ion-exchange, of small, fast diffusive "dopant" ions (like Li+, Ag+) replaces bigger, slower-diffusive ions (like Na+, K+) under designed neutral or slightly compressive stress conditions to achieve a certain dopant concentration level for the future strengthening ion exchange where desired DOL/DOC can be established. The neutral or slightly compressive stress conditions can be achieved by ion exchange at high temperatures close to strain point of glass and/or in combination with larger ions to eliminate tension stress in glass during doping. A ratio of smaller ions to larger ions in the doping ion exchange bath may be used to define the compressive stress on the surface. In one or more embodiments, a ratio of smaller to larger ions is 0.2:1 or greater. The ratio may be 0.2:1, 0.3:1, 0.4:1, 0.5:1, 0.6:1, 0.7:1, 0.8:1, 0.9:1, or 1:1, and all values and sub-ranges therebetween. Neutral to slightly compressive stress conditions include: the range of 0 to less than about 1000 MPa; 0 to less than about 900 MPa; 0 to less than about 850 MPa; 0 to less than about 800 MPa; 0 to less than about 750 MPa; 0 to less than about 700 MPa; 0 to less than about 650 MPa; 0 to less than about 600 MPa; 0 to less than about 550 MPa; 0 to less than about 500 MPa; 0 to less than about 450 MPa; 0 to less than about 400 MPa; or more particularly 0 to less than about 350 MPa, and all values and sub-ranges therebetween. The first ion exchange treatment may be conducted at a bath temperature that is ±300° C. of a strain point of the glass-based substrate. In an embodiment, the bath temperature of the first ion exchange treatment is ±150° C. of the strain point of the glass-based substrate. In one or more embodiments, the first treatment may be conducted at a bath temperature in the range of 380 to 525° C. Ions may be supplied as admixtures of molten salts or eutectics that are substantively soluble and stable at the temperatures of the first treatment.

With respect to the second treatment of strengthening, conventional ion-exchange involves large ions (like K+, Na+, Rb+) replacing smaller ions (like Li+, Ag+, Na+,) under lower, typical ion-exchange temperature conditions to impart the desired surface CS. This step can incorporate additional ions (like Ag+, Cu+, Zn+, Ti+, Cs+, Ca+, Mg+) to impart functionalities (like anti-microbial, self-cleaning) or be followed by additional IOX steps. The second treatment may be conducted at a bath temperature in the range of 370 to 450° C. In one or more embodiments, the second treatment is conducted at a bath temperature that is less than the first treatment. Ions may be supplied as admixtures of molten salts that are substantively soluble and stable at the temperatures of the first treatment.

The resulting glass-based articles have an engineered or designed stress profile comprising a depth of compression (DOC) that is at least about 4% of the article's thickness or deeper. For example the DOC may be at least about 5%, 6%, 7%, 8%, 9%, 10%, or 15% of the article's thickness, and all values and sub-ranges therebetween. In one or more embodiments, the resulting glass-based articles have an engineered or designed stress profile comprising a depth of layer (DOL) that is at least about 5 microns or deeper. For example the DOL may be at least about 5 microns, about 5.5 microns, about 6 microns, about 6.5 microns, about 7 microns, about 7.5 microns, about 8 microns, about 8.5 microns, about 9 microns, about 9.5 microns, or about 10 microns, and all values and sub-ranges therebetween. In one or more embodiments, a ratio of the DOC to the DOL is greater than 1:1, greater than 6:1, or greater than 10:1. In some embodiments, the DOC of the glass-based articles herein is generally deeper than a comparative DOC of the glass-based substrate not subjected to the first doping ion exchange treatment.

The articles may also have a stress profile having a high compressive stress (CS) spike of about 350 MPa or greater at one or both of its surfaces; about 400 MPa or greater; about 450 MPa or greater; about 500 MPa or greater; about 550 MPa or greater; about 600 MPa or greater; about 650 MPa or greater about 700 MPa or greater; about 750 MPa or greater; about 800 MPa or greater; about 850 MPa or greater; about 900 MPa or greater; about 950 MPa or greater; or about 1000 MPa or greater; and all values and sub-ranges therebetween. In an embodiment, the CS is at least 1000 MPa at one or both of its surfaces. In one or more embodiments, the glass-based articles include designed stress profiles that provide damage resistance, drop performance, and/or scratch resistance. The glass-based articles may be used in consumer electronics, transportation, architecture, defense, medical, packaging, and other applications where a thin, strong glass product is advantageous.

The glass-based articles disclosed herein are advantageous in providing improved mechanical and/or chemical reliability. In some embodiments, increased surface CS, DOL, DOC, DOL/DOC metrics lead to, for example, improved mechanical performance such as damage resistance, drop performance, and scratch resistance. After IOX, there is improved chemical reliability such as hydrolytic resistance, which is desirable for outdoor and handling applications such as signage, windshields, pharmaceutical packaging, and the like.

The methodology of the present disclosure offers further advantages. It is amenable to all alkali-containing glasses and glass-ceramics capable of ion exchange. Flexibility in stress profile engineering is provided without compromising the intrinsic properties of the base glass (e.g. sagging point, softening point). Features of enhanced CS and Li-doping may enable greater chemical durability metrics. The methodology is easy to scale-up for mass production with existing capital for chemical strengthening using minimal additional investment. Stress profiles for glasses that suffer from significant viscoelastic stress relaxation from ion-exchange can be enhanced. DOL enhancement can be achieved at longer IOX times without significant drop in IOX induced stress, which can be typical to soda lime silicate glass. The present methods reduce/eliminate cost, complexity, and risk of new glass and forming platform development efforts needed for iterative mechanical improvements. Improvements can be achieved for applications in industries that are sensitive to glass composition changes due to reasons of manufacturing, supply chain or regulatory limitations.

With specific respect to Li-containing glass and glass-ceramics, there are further advantages. The IOX based doping strategy of the first treatment, when utilizing Li, enables more efficient utilization of Li starting materials as compared to use of Li in the bulk glass of Li containing glass. Li is an expensive raw material with limited sources. The second treatment of strengthening removes the Li from the surface alleviating problems relating to blooming effects caused by small mobile ions such as Li in the final product thereby causing local surface regions of low stress, that may lead to performance issues such as poor scratch performance, increased alkali mobility, and the like.

Turning to the figures, FIG. 1 illustrates a multi-step ion exchange (IOX) scheme. In a non-limiting exemplary embodiment, a glass-based substrate 10 comprising an alkali metal oxide in a base composition that is pre-fabricated is provided as part of a first treatment—"high temperature Li doping." The substrate 10 comprising sodium as the alkali metal of the alkali metal oxide, for example, a soda lime glass, is exposed at a high temperature to a first IOX bath comprising metal ions that are smaller than the alkali metal(s) of the alkali metal oxide(s) of the base composition. In general terms, the bath temperature of the first treatment is less than or equal to a glass transition temperature (Tg) of the glass-based substrate. In one or more embodiments, the first bath temperature is ±300° C. of a strain point of the glass-based substrate. In one or more embodiments, the first bath temperature is ±150° C. of a strain point of the glass-based substrate. The high temperature may be in the range of 380 to 525° C. Metal ions in the first bath of this non-limiting example include lithium (Li) and potassium (K). Metal ions may be delivered by molten salts, eutectics, or both. Li is doped into the thickness (t). K is doped into the t, but not as deeply as the Li. A size ratio of the ions that are smaller than the alkali metal(s) in the base composition to the one or more alkali metals in the base composition may be at least 0.2:1. Upon completion of the first treatment, a doped glass-based substrate 15 is obtained. The doped substrate contains ions from the ion baths in concentrations that vary within at least a portion of the thickness of the substrate. A first ion exchange is achieved between lithium of the first bath and sodium of the base composition, or among lithium and potassium, both of the first bath, and sodium of the base composition.

The substrate is then exposed to a second IOX bath at a temperature that is generally lower than that of the first IOX bath. The second IOX bath comprises metal ions that are larger than the alkali metal(s) of the alkali metal oxide(s) of the base composition. Therefore the composition of the second bath is different from the composition of the first bath. Metal ions in the second bath of this non-limiting example include sodium (Na) and potassium (K). Metal ions of the second bath may be delivered by molten salts of the ions. The second bath may further comprise one or more ions of: sodium, silver, copper, zinc, titanium, rubidium, cesium, calcium, and magnesium. The temperature of the second bath may be in the range of 370 to 450° C. Na and K are doped into the t. Upon completion of the second treatment, a glass-based article 20 is obtained, which has been chemically strengthened. A second ion exchange is achieved among K and/or Na of the second bath and ion-exchanged lithium of the first ion exchange treatment and sodium of the base composition. That is, there are: a first metal oxide whose metal has the same or smaller atomic radius than the alkali metal of the alkali metal oxide in the base composition, and a second metal oxide whose metal has a larger atomic radius than the alkali metal of the alkali metal oxide in the base composition. The sodium of the base composition is present in a central tension region, where there is tensile stress, of the substrate and resulting article. The lithium and the potassium are present at least in a compressive stress region, where their concentrations independently vary with thickness. In some embodiments, the alkali metal oxide present in central tension region is not lithium oxide.

Generally, the methods herein occur in the absence of heat treatment to the glass-based substrate. That is, in one or more embodiments, strengthening is obtained only by IOX treatment.

The IOX baths may comprise further ions including but not limited to silver, copper, zinc, titanium, rubidium, cesium, calcium, and magnesium for imparting further desired properties. The glass-based articles herein may therefore further comprise one or more further ion-exchanged metals selected from the group consisting of: silver, copper, zinc, titanium, rubidium, cesium, calcium, and magnesium The ion exchange processes may independently be a thermal-diffusion process or an electro-diffusion process. Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No.

61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

Examples of glass-based substrates that may be used include but are not limited to soda-lime silicate glass, an alkali-alumino silicate glass, an alkali-containing borosilicate glass, an alkali-alumino borosilicate glass, an alkali-containing lithium alumino silicate glass, or an alkali-containing phosphate glass. In some embodiments, the base composition of the glass-based substrate does not contain lithium oxide ($Li_2O$). It can be determined if the base concentration of the glass-based substrate that has been ion exchanged did not contain lithium oxide if the composition at of the glass-base substrate at 0.5* thickness (the center of the glass-based substrate) does not contain lithium oxide. The glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size.

Figure 2A:
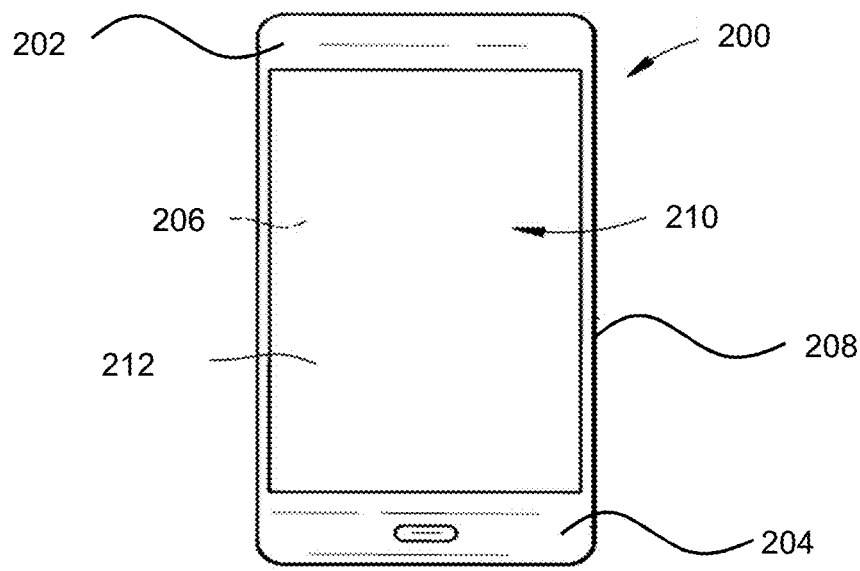
FIG. 2A is a plan view of an exemplary electronic device incorporating any of the strengthened laminated glass-based articles disclosed herein.
Figure 2B:
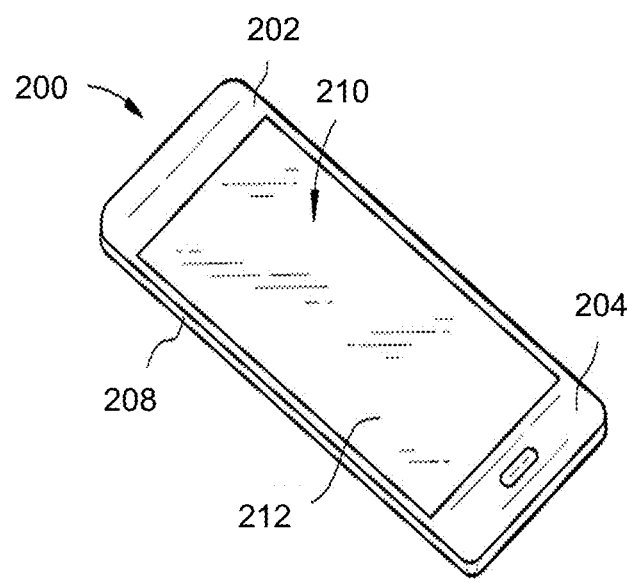
FIG. 2B is a perspective view of the exemplary electronic device of FIG. 2A.

An exemplary article incorporating any of the strengthened articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least one of a portion of the housing and the cover substrate 212 may include any of the strengthened articles disclosed herein.

In one or more embodiments, the glass-based substrate has an alkali metal oxide content of 2 mole % or greater.

Exemplary substrates may comprise but are not limited to: alkali-alumino silicate glass, alkali-containing borosilicate glass, alkali-containing aluminoborosilicate glass, and alkali-containing glass-ceramics.

In an embodiment, the glass substrate comprises a soda lime silicate glass. In and embodiment, the soda lime silicate glass composition is, on an oxide basis: 73.5 wt. % $SiO_2$, 1.7 wt. % $Al_2O_3$, 12.28 wt. % $Na_2O$, 0.24 wt. % $K_2O$, 4.5 wt. % MgO, 7.45 wt. % CaO, 0.017 wt. % $ZrO_2$, 0.032 wt. % $TiO_2$, 0.002 wt. % $SnO_2$, 0.014 wt. % SrO, 0.093 wt. % $Fe_2O_3$, 0.001 wt. % $HfO_2$, 0.028 wt. % Cl oxide(s), and 0.203 wt. % $SO_3$.

In one or more embodiments, the glass-based articles herein have a surface compressive stress after a final IOX step of: 1000 MPa or greater, 950 MPa or greater, 900 MPa or greater, 850 MPa or greater, 800 MPa or greater, 750 MPa or greater, 700 MPa or greater, 650 MPa or greater, 600 MPa or greater, 550 MPa or greater, 500 MPa or greater, 450 MPa or greater, 400 MPa or greater, 350 MPa or greater, and all values and sub-ranges therebetween.

In one or more embodiments, the glass-based articles herein have a thickness (t) in the range of 0.1 mm to 10 mm, 0.2 mm to 9 mm, 0.3 mm to 8 mm, 0.4 mm to 7 mm, 0.5 mm to 6 mm, 0.6 mm to 5 mm, 0.7 mm to 4 mm, 0.8 mm to 3 mm, 0.9 mm to 2 mm, and 1 mm to 1.9 mm, and all values and sub-ranges therebetween.

EXAMPLES

Various embodiments will be further clarified by the following examples. In the Examples, prior to being strengthened, the Examples are referred to as "substrates". After being subjected to strengthening, the Examples are referred to as "articles" or "glass-based articles".

In all of the Examples, a soda lime silicate glass substrate having a 0.7 millimeter thickness was used. The composition was on an oxide basis: 73.5 wt. % $SiO_2$, 1.7 wt. % $Al_2O_3$, 12.28 wt. % $Na_{2O}$, 0.24 wt. % $K_2O$, 4.5 wt. % MgO, 7.45 wt. % CaO, 0.017 wt. % $ZrO_2$, 0.032 wt. % $TiO_2$, 0.002 wt. % $SnO_2$, 0.014 wt. % SrO, 0.093 wt. % $Fe_2O_3$, 0.001 wt. % $HfO_2$, 0.028 wt. % Cl oxide(s), and 0.203 wt. % $SO_3$.

A surface stress meter (FSM), the FSM-6000, manufactured by Orihara Industrial Co., Ltd. (Japan) was used to measure compressive stress at the surface (CS). Compressive stress at DOL (CSk), depth of layer (DOL), depth of compression (DOC), and central tension (CT) were measured by the refracted near-field (RNF) method discussed previously.

Comparative Example A

As an example of traditional one-step ion exchange, the soda lime silicate glass substrate was exposed to a one ion bath comprising 100 wt. % $KNO_3$ at a bath temperature of 430° C. for 11 hours to result in a comparative glass-based article. Comparative Example A did not include a doping step.

Example 1

A glass-based article was formed from exposure of the soda lime silicate glass substrate to two process treatments. The first treatment (doping) was an ion bath comprising 25 wt. % $KNO_3$, 74 wt. % NaNO, and 1 wt. % $LiNO_3$ at a bath temperature of 490° C. for 12 hours. The second treatment (strengthening) was an ion bath comprising 89 wt. % $KNO_3$, 1 wt. % $K_2CO_3$, and 10 wt. % NaNO at a bath temperature of 430° C. for 12 hours.

Example 2

A glass-based article was formed from exposure of the soda lime silicate glass substrate to two process treatments. The first treatment (doping) was the same as Example 1: an ion bath comprising 25 wt. % $KNO_3$, 74 wt. % NaNO, and 1 wt. % $LiNO_3$ at a bath temperature of 490° C. for 12 hours. The second treatment (strengthening) was an ion bath comprising 89 wt. % $KNO_3$, 1 wt. % $K_2CO_3$, and 10 wt. % NaNO at a bath temperature of 430° C. for 4 hours.

Example 3

A glass-based article was formed from exposure of the soda lime silicate glass substrate to two process treatments. The first treatment (doping) was an ion bath comprising 25 wt. % $KNO_3$, 74 wt. % NaNO, and 1 wt. % $LiNO_3$ at a bath temperature of 500° C. for 24 hours. The second treatment (strengthening) was an ion bath comprising 89 wt. % KNO$_3$, 1 wt. % K$_2$CO$_3$, and 10 wt. % NaNO at a bath temperature of 430° C. for 8 hours.

Example 4

A glass-based article was formed from exposure of the soda lime silicate glass substrate to two process treatments. The first treatment (doping) was the same as Example 3: an ion bath comprising 25 wt. % KNO$_3$, 74 wt. % NaNO, and 1 wt. % LiNO$_3$ at a bath temperature of 500° C. for 24 hours. The second treatment (strengthening) was an ion bath comprising 89 wt. % KNO$_3$, 1 wt. % K$_2$CO$_3$, and 10 wt. % NaNO at a bath temperature of 430° C. for 4 hours.

Example 5

A glass-based article was formed from exposure of the soda lime silicate glass substrate to two process treatments. The first treatment (doping) was: an ion bath comprising 25 wt. % KNO$_3$, 73 wt. % NaNO, and 2 wt. % LiNO$_3$ at a bath temperature of 500° C. for 24 hours. The second treatment (strengthening) was an ion bath comprising 89 wt. % KNO$_3$, 1 wt. % K$_2$CO$_3$, and 10 wt. % NaNO at a bath temperature of 430° C. for 8 hours.

Comparative Example B

A comparative glass-based article was formed from exposure of the soda lime to only the second treatment (strengthening) according to Example 1: an ion bath comprising 89 wt. % KNO$_3$, 1 wt. % K$_2$CO$_3$, and 10 wt. % NaNO at a bath temperature of 430° C. for 12 hours. Comparative Example B did not include a doping step.

Stress Profile Testing

Attributes of the stress profiles of the glass-based articles of Comparative Examples A-B and inventive Examples 1-2 were tested and the results are provided in Table 1.

TABLE 1[A]

| EXAMPLE | CS MPa | CSk MPa | DOL[B] microns | DOC microns | CT MPa |
|---|---|---|---|---|---|
| Example 1 | 537.3 | 67.6 | 7.7 | 59.4 | −2.8 |
| Example 2 | 542.3 | 51.6 | 9 | 42.7 | 7.1 |
| Example 3 | 533.8 | 60 | 8 | 68 | −7.8 |
| Example 4 | 559.8 | 60.5 | 7.5 | 57.2 | −2.4 |
| Example 5 | 594.9 | 113.4 | 6.5 | 77.7 | −35.6 |
| Comparative Example A | 525 | — | 15.4 | −15.4 | — |
| Comparative Example B | 393 | — | 15.9 | 15.9 | — |

[A] non-tin side FSM/RNF results reported
[B] DOL with respect to potassium/sodium exchange after second treatment.

Figure 3A:
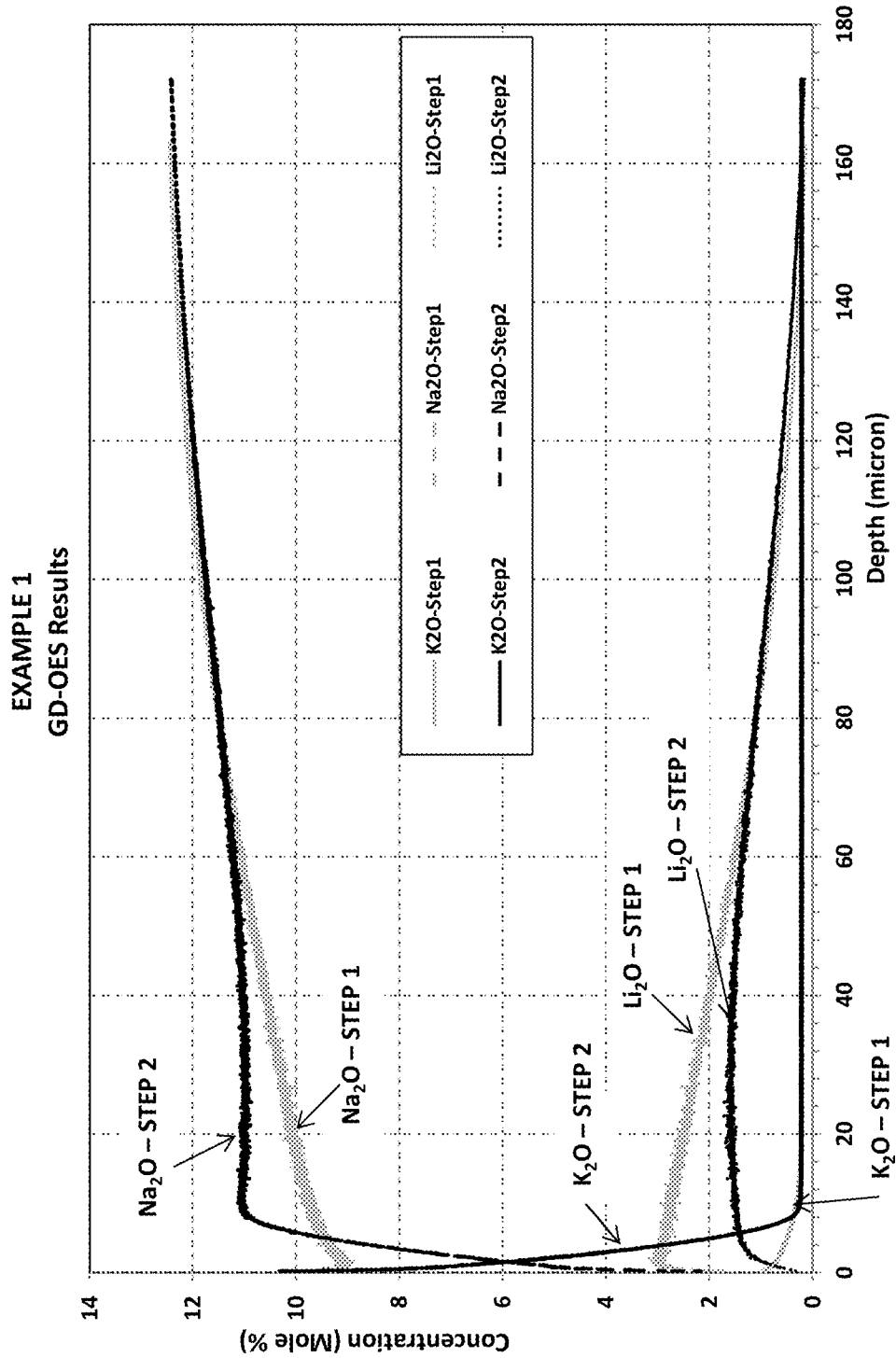
FIG. 3A provides a graph of concentration (mole %) versus depth (microns) for each of potassium, sodium, and lithium for Example 1 after exposure to the first treatment (Step 1) and after exposure to the second treatment (Step 2)
Figure 3B:
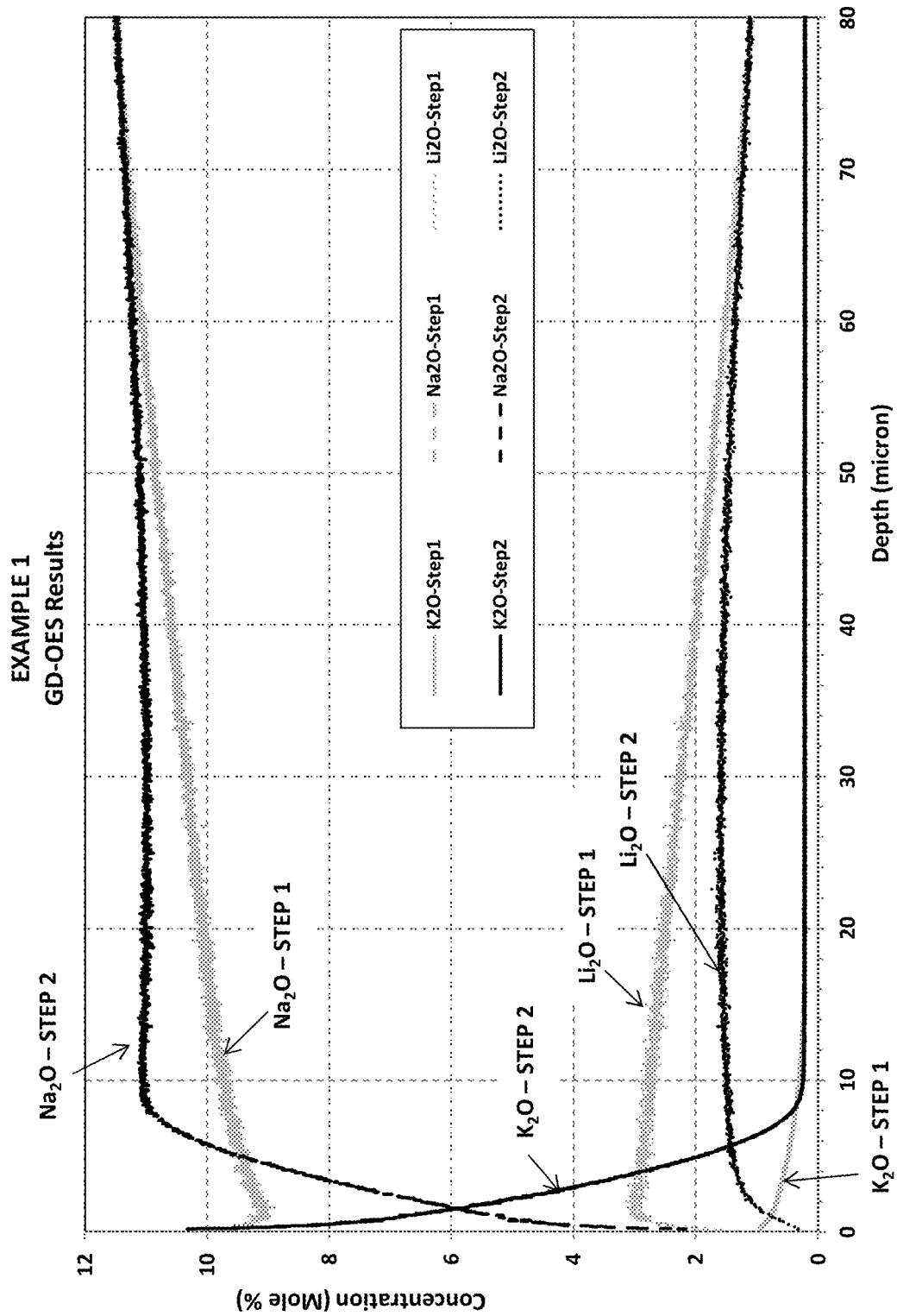
FIG. 3B is an enlargement of FIG. 3A.

FIG. 3A provides Glow Discharge-Optical Emission Spectroscopy (GD-OES) results for Example 1, showing concentration (mole %) versus depth (microns) for each of potassium, sodium, and lithium after exposure to the first treatment (Step 1) and after exposure to the second treatment (*Step* 2). Air side of sample was measured. FIG. 3B is an enlarged version of FIG. 3A. For Example 1, depth of layer (DOL) with respect to potassium/sodium exchange was about 7.7 microns after the second treatment. FIGS. 3A-3B illustrate that after Step 1, Li+ has been doped into glass through Li/Na exchange. The depth of Li-doping zone is about 160-180 microns. After Step 2, Na/Li exchange indeed occurred, resulting in a deep DOC (59.4 microns).

Figure 4A:
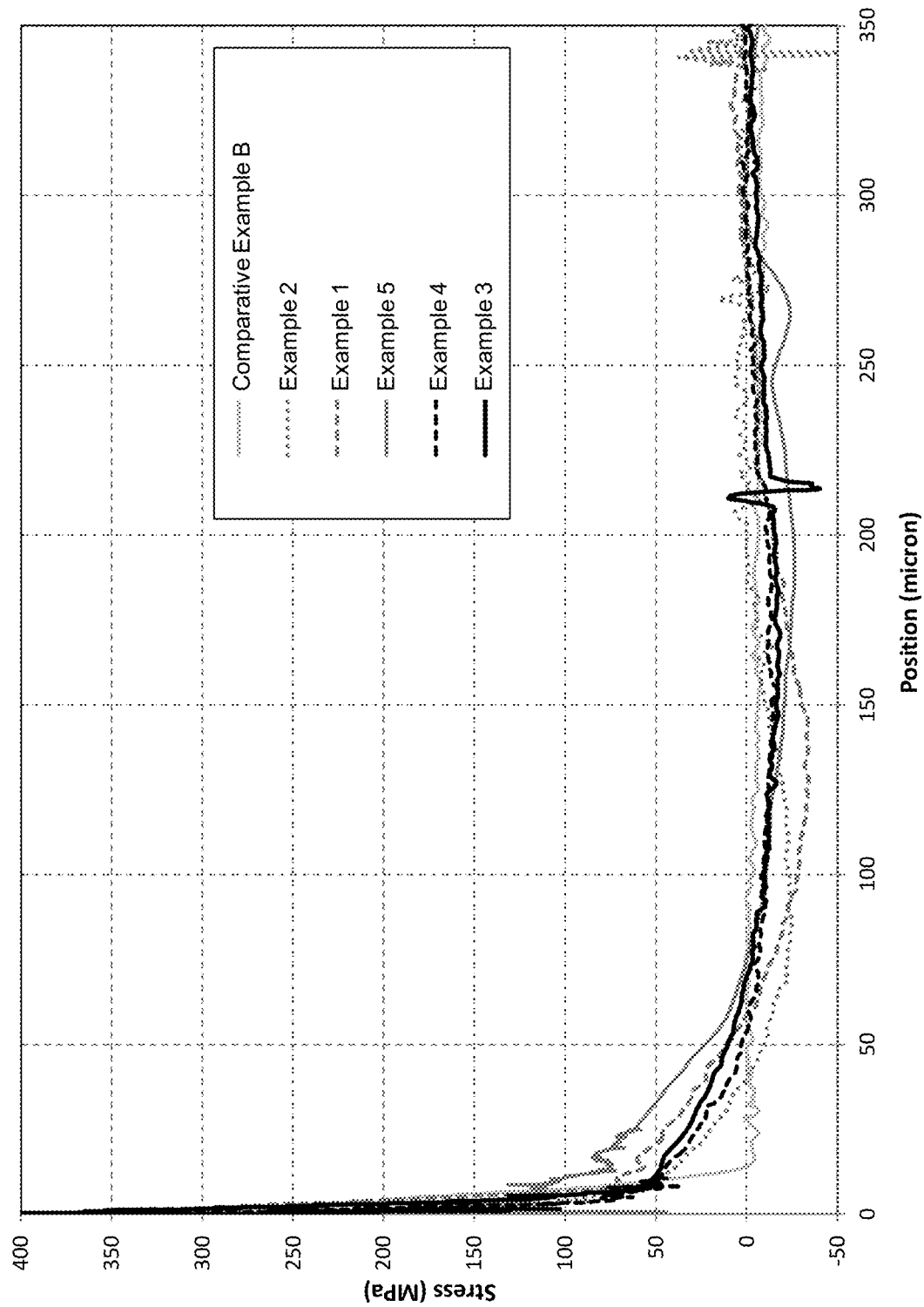
FIG. 4A provides a stress profile of stress (MPa %) versus position (microns) for Examples 1-5 and Comparative Example B.
Figure 4B:
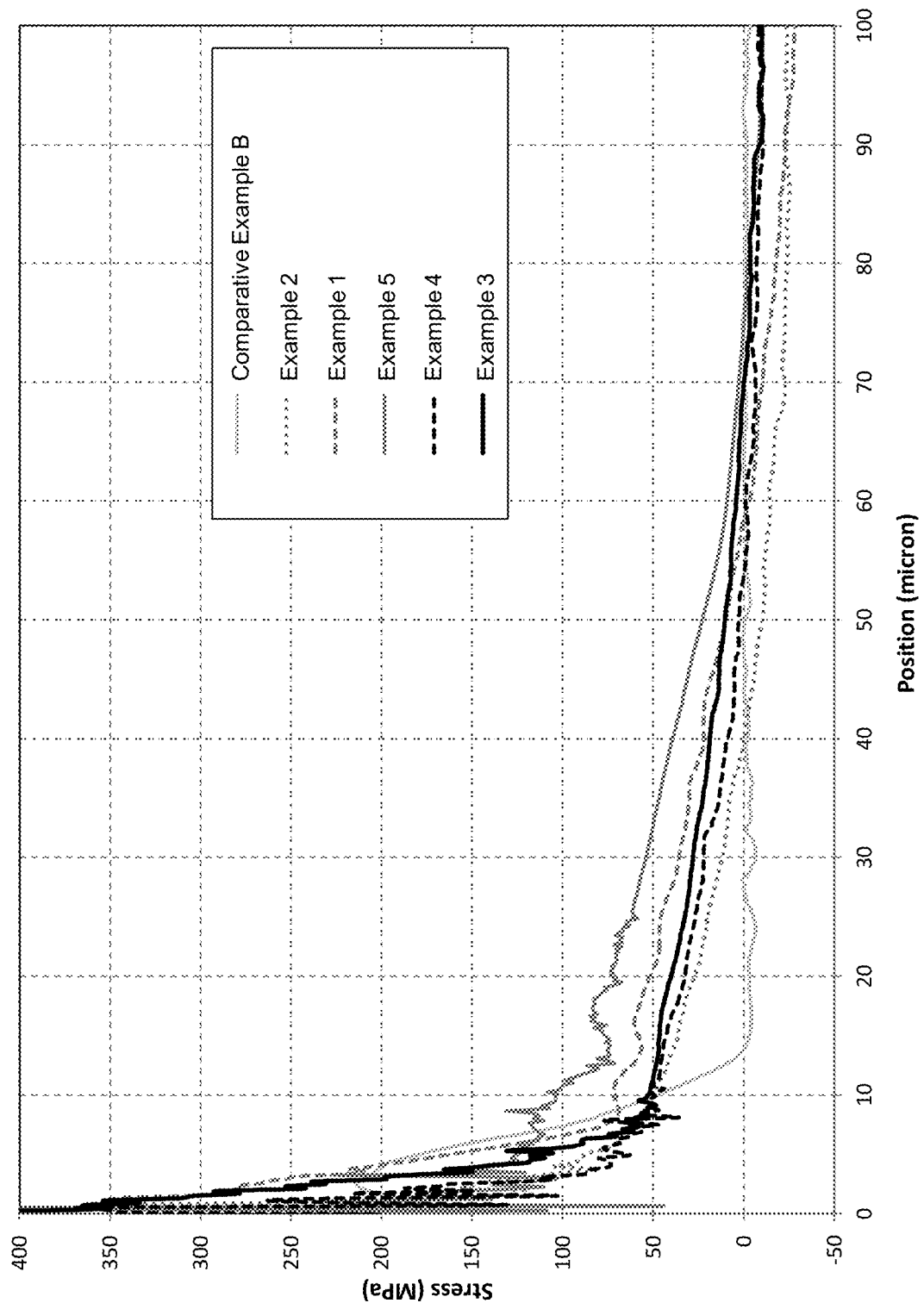
FIG. 4B is an enlargement of FIG. 4A.

FIG. 4A provides Refracted near-field (RNF) results for Examples 1-5 and Comparative Example B, showing stress (MPa) versus position (microns). FIG. 4B is an enlarged version of FIG. 4A. The inclusion of the doping Step 1 has profound impact on the stress profile in terms of compressive stress at the surface and the location of the DOC. Higher temperature (500° C. vs 490° C.) and longer time (24 hrs vs 12 hrs) in the Step 1 makes the shape of the stress profile less W-shape, and therefore a deeper DOC.

Chemical Durability Testing

Hydrolytic resistance as an indicator of chemical durability was measured as follows. Test procedure: (1) a glass coupon (2" by 2") was placed in a 100 mL fused silica beaker, filled with 167 mL DI water and sealed with pre-cleaned Al foil and rubber band. (2) beaker was placed in an autoclave having a temperature setpoint of 135° C. The dwell time was 24 hours. (3) solution temperature cooled to below 25° C. and coupon removed from the beaker, rinsed, and dried for weight loss measurement; for solution analysis, 50 mL aliquot of solution was titrated with 0.01M HCl. (4) Normalized weight loss (mg/cm$^2$) and normalized solution alkalinity (OH, micromol/cm$^2$) are provided in Table 2.

TABLE 2

| EXAMPLE | Normalized weight loss (mg/cm$^2$) | Alkalinity OH (micromol/cm$^2$) |
|---|---|---|
| Example 1 Li-doped soda lime silicate glass | 0.499 | 3.352 |
| Comparative A soda lime silicate glass | 0.652 | 4.415 |

The glass-based articles comprising a glass-based substrate that contains one or more alkali metals in a base composition and one or more ion-exchanged metals may therefore have a normalized weight loss after 24 hours dwell time in a water bath at 130° C. that is less than a comparative substrate with the absence of ion-exchanged metals.

While the foregoing is directed to various embodiments, other and further embodiments of the disclosure may be devised without departing from the basic scope thereof, and the scope thereof is determined by the claims that follow.

What is claimed is:

1. A method of manufacturing a glass-based article comprising:
exposing a glass-based substrate that contains an alkali metal oxide in a base composition, the glass-based substrate having opposing first and second surfaces defining a substrate thickness (t), to a first ion exchange treatment including a first bath comprising first metal ions that are smaller than the alkali metal of the alkali metal oxide in the base composition to form a doped glass-based substrate, wherein the first bath comprises sufficient first metal ions to introduce the first metal ions into the glass-based substrate and thereby form the doped glass-based substrate; and
thereafter exposing the doped glass-based substrate to a second ion exchange treatment including a second bath comprising second metal ions that are larger than the alkali metal of the alkali metal oxide in the base composition to form the glass-based article, wherein the second bath comprises sufficient second metal ions to introduce the second metal ions into the doped glass-based substrate.

2. The method of claim 1, wherein both the first and second metal ions are present as first and second metal oxides in first and second concentrations that independently vary within at least a portion of the t.

3. The method of claim 1, wherein there is no heat treatment to the glass-based substrate other than during the first and second ion exchange treatments.

4. The method of claim 1, wherein the glass-based article has a stress profile comprising: a depth of compression (DOC) being located at 0.04·t or deeper and a central tension region.

5. The method of claim 1, wherein the doped glass-based substrate comprises a compressive stress (CS) that is in the range of 0 to less than about 1000 MPa.

6. The method of claim 1, wherein the first bath comprises lithium ions.

7. The method of claim 6, wherein the first bath further comprises potassium ions.

8. The method of claim 1, wherein the first ion exchange treatment includes a first ion exchange between lithium of the first bath and sodium of the base composition, or among lithium and potassium, both of the first bath, and sodium of the base composition.

9. The method of claim 1, wherein the first ion exchange treatment is conducted at a bath temperature that is less than or equal to a glass transition temperature (Tg) of the glass-based substrate.

10. The method of claim 1, wherein the first ion exchange treatment is conducted at a bath temperature that is greater than a bath temperature of the second ion exchange treatment.

11. The method of claim 1, wherein the first ion exchange treatment is conducted at a bath temperature that is ±300° C. of a strain point of the glass-based substrate.

12. The method of claim 1, wherein the first ion exchange treatment is conducted at a bath temperature in the range of from 380 to 525° C.

13. The method of claim 1, wherein during the first ion exchange treatment a ratio of the ions that are smaller than the alkali metal of the alkali metal oxide in the base composition to the alkali metal of the alkali metal oxide in the base composition is at least 0.2:1.

14. The method of claim 1, wherein the second bath comprises potassium ions.

15. The method of claim 14, wherein the second bath further comprises sodium ions.

16. The method of claim 1, wherein the second ion exchange treatment includes a second ion exchange among potassium of the second bath and ion-exchanged lithium of the first ion exchange treatment and sodium of the base composition.

17. The method of claim 16, wherein the second ion exchange treatment includes a second ion exchange among sodium of the second bath and ion-exchanged lithium of the first ion exchange treatment.

18. The method of claim 1, wherein the second bath further comprises one or more ions of: sodium, silver, copper, zinc, titanium, rubidium, cesium, calcium, and magnesium.

19. The method of claim 1, wherein the second ion exchange treatment is conducted at a bath temperature in the range of 370 to 450° C.

20. The method of claim 1, wherein the first ion exchange treatment, the second ion exchange treatment, or both are independently a thermal-diffusion process or an electro-diffusion process.

21. The method of claim 1, wherein the first ion exchange treatment independently comprises molten salts, eutectics, or both of ions.

22. The method of claim 1, wherein the second ion exchange treatment comprises molten salts of the ions.

23. The method of claim 1, wherein the base composition does not contain lithium oxide.

* * * * *